United States Patent
Ueda et al.

(10) Patent No.: US 8,092,582 B2
(45) Date of Patent: Jan. 10, 2012

(54) WET-TYPE EXHAUST GAS DESULFURIZER

(75) Inventors: Takuro Ueda, Hiroshima (JP); Atsushi Katagawa, Hiroshima (JP); Hiroshi Ishizaka, Hiroshima (JP)

(73) Assignee: Babcock-Hitachi Kabushiki Kaisha, Tokyo (JP)

( * ) Notice: Subject to any disclaimer, the term of this patent is extended or adjusted under 35 U.S.C. 154(b) by 601 days.

(21) Appl. No.: 12/295,070

(22) PCT Filed: Mar. 27, 2007

(86) PCT No.: PCT/JP2007/056313
§ 371 (c)(1),
(2), (4) Date: Sep. 29, 2008

(87) PCT Pub. No.: WO2007/116714
PCT Pub. Date: Oct. 18, 2007

(65) Prior Publication Data
US 2009/0173234 A1    Jul. 9, 2009

(30) Foreign Application Priority Data
Apr. 4, 2006 (JP) .................................. 2006-102802

(51) Int. Cl.
*B01D 47/06* (2006.01)
(52) U.S. Cl. ....... 96/322; 95/235; 261/115; 423/243.08; 423/244.07
(58) Field of Classification Search ............... 95/235, 95/261, 115–118; 423/243.8, 244.07
See application file for complete search history.

(56) References Cited

U.S. PATENT DOCUMENTS
2,650,860 A * 9/1953 Carr ............................... 239/468
(Continued)

FOREIGN PATENT DOCUMENTS
JP            57-68122      *   4/1982
(Continued)

OTHER PUBLICATIONS
English language Abstract of JP 2004-024945 A.
(Continued)

*Primary Examiner* — Duane Smith
*Assistant Examiner* — Ives Wu
(74) *Attorney, Agent, or Firm* — Greenblum & Bernstein, P.L.C.

(57) ABSTRACT

An absorbing tower provided with plural spray headers (3) which each have a plurality of spray nozzles (5) and are arranged in a multi-stage state in the flow direction of exhaust gas, in which an absorption liquid containing a slurry of limestone or lime is sprayed through the nozzles (5) to absorb and remove sulfur oxide contained in exhaust gas, wherein each spray nozzle (5) is of an annular spray type (a hollow cone type) and the spray nozzles (5) in the neighborhood of the tower wall have such a structure that the fluid is sprayed radially at spray angles of 50 to 80° with the direction counter to the flow of exhaust gas as the center, while the nozzles (5) in the central part of the tower have such a structure that the fluid is sprayed radially at spray angles of 80 to 130° with the direction counter to the flow thereof as the center. According to the invention, the channeling of exhaust gas in the tower can be inhibited by using two kinds of spray nozzles (5) to thereby prevent the desulfurization performance from lowering caused by blow-by of exhaust gas in the neighborhood of the tower wall. Further, an extremely high pressure loss can be inhibited by the flow-regulating effect of sprayed droplets. Thus, a wet-type exhaust gas desulfurizer with a reduced total cost is obtained.

2 Claims, 9 Drawing Sheets

U.S. PATENT DOCUMENTS

| | | | | |
|---|---|---|---|---|
| 3,326,473 | A | * | 6/1967 | Wahlin ............................ 239/468 |
| 5,176,325 | A | * | 1/1993 | Vidusek ........................ 239/419.3 |
| 5,620,144 | A | * | 4/1997 | Strock et al. ..................... 239/557 |
| 5,693,293 | A | * | 12/1997 | Reichardt et al. .............. 422/168 |

FOREIGN PATENT DOCUMENTS

| | | | |
|---|---|---|---|
| JP | 5768122 | * | 4/1982 |
| JP | 8-206448 A | | 8/1996 |
| JP | 8-511615 A | | 12/1996 |
| JP | 11-179144 | | 7/1999 |
| JP | 11179144 | * | 7/1999 |
| JP | 2004-024945 | * | 1/2004 |
| JP | 2004-024945 A | | 1/2004 |
| WO | 95/00805 | | 1/1995 |

OTHER PUBLICATIONS

English language Abstract of JP 8-206448 A.
English language Abstract of JP 11-179144 A.
U.S. Appl. No. 12/097,814 to Oda et al., filed Jun. 17, 2008.

* cited by examiner

FIG. 1

○ : SPRAY ANGLE 80~130°
● : SPRAY ANGLE 50~80°

PRIOR ART

FIG. 10

PRIOR ART

○ : SPRAY ANGLE APPROXIMATELY 90°

FIG. 11

PRIOR ART

WET-TYPE EXHAUST GAS DESULFURIZER

TECHNICAL FIELD

The present invention relates to a wet-type exhaust gas desulfurizer that reduces sulfur oxide (hereinafter, sometimes referred to as SOx) in an exhaust gas, soot and dust, and components and substances contained in a boiler fuel by use of an absorption liquid containing a slurry including limestone or lime.

BACKGROUND ART

Figure 11:
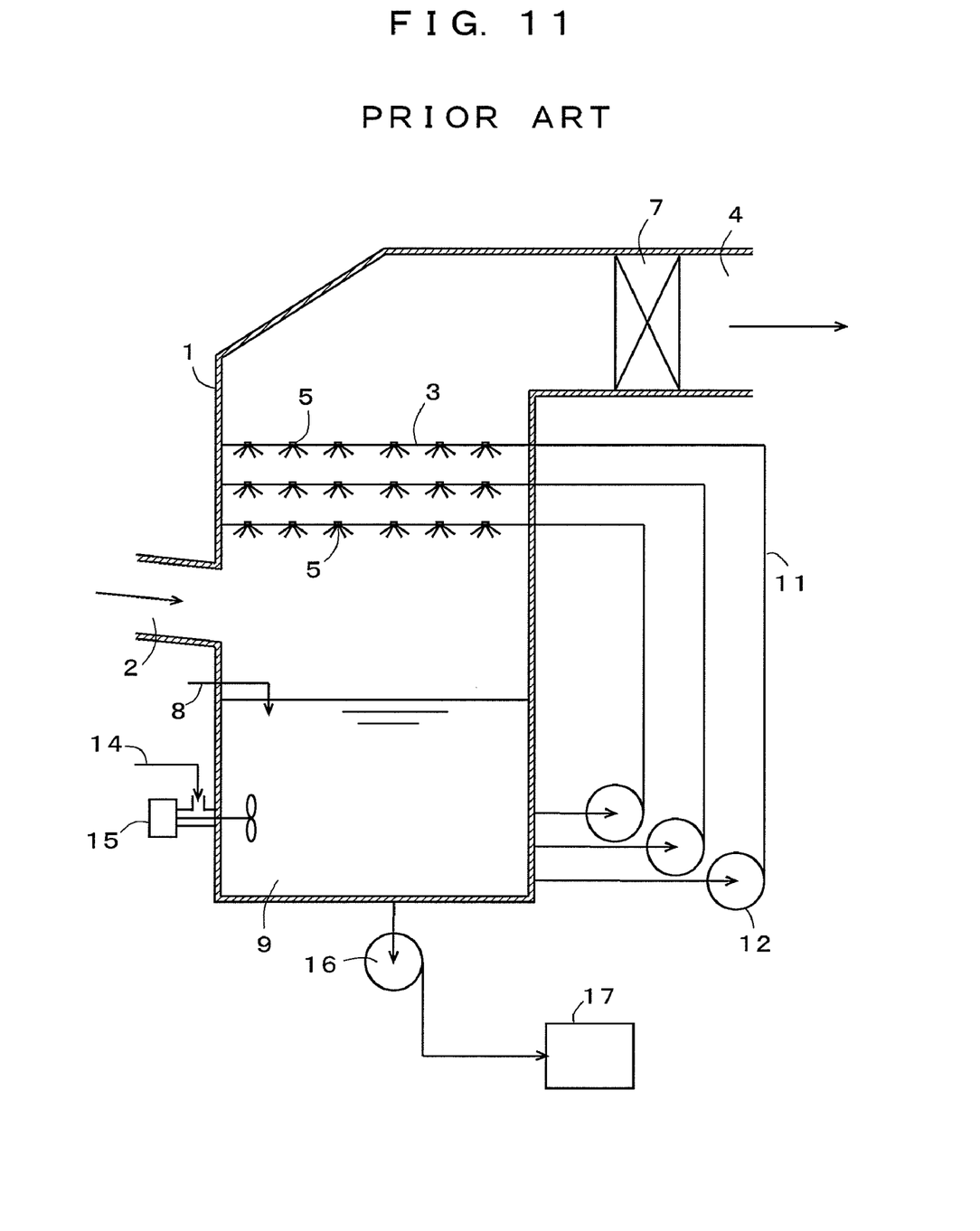
FIG. 11 is a view showing a system of a wet-type exhaust gas desulfurizer of a conventional art.

For prevention of air pollution, wet-type limestone-gypsum desulfurizers have been widely put into practical use as apparatuses that remove sulfur oxide and the like contained in exhaust gases. This wet-type exhaust gas desulfurizer has such a structure, as shown in FIG. 11, that an exhaust gas emitted from a combustion apparatus such as a boiler is introduced into an absorption tower 1 through an inlet flue 2, and as a result of contact with droplets of an absorption liquid of a slurry including limestone or lime or the like sprayed from spray nozzles 5 respectively provided on spray headers 3 installed in the absorption tower 1 and provided in multiple stages along the direction of an exhaust gas flow, SOx in the exhaust gas is absorbed along with acid gases such as hydrogen chloride (HCl), hydrogen fluoride (HF), and the like in the exhaust gas. Simultaneously, soot and dust caused by components contained in the fuel used by the combustion apparatus and other substances are absorbed and removed by the absorption liquid.

Moreover, mist made to accompany the exhaust gas is removed by a mist eliminator 7 installed in an outlet flue 4 of the absorption tower 1, and a clean exhaust gas passes through the outlet flue 4, is reheated as necessary and emitted from a funnel. An SOx absorbent, for example, limestone, is fed as a limestone slurry 8 into a liquid trapping section 9 of the absorption tower 1 by an unillustrated limestone slurry pump according to the amount of SOx absorption.

The absorption liquid in the liquid trapping section 9 is extracted by a plurality of absorption liquid circulation pipes 11 that connect with the liquid trapping section 9, raised in pressure by absorption tower circulation pumps 12 provided on the circulation pipes 11, sent to the spray headers 3 connected to the respective circulation pipes 11, respectively, and then sprayed from the spray nozzles 5. The exhaust gas that rises inside the absorption tower 1 makes gas-liquid contact with the sprayed absorption liquid droplets, and SOx and the like in the exhaust gas are absorbed and removed.

The SOx in the exhaust gas reacts with calcium in the absorption liquid to form calcium sulfite (including calcium bisulfite) as an intermediate product, falls in the liquid trapping section 9, and is oxidized into gypsum by air 14 fed to the liquid trapping section 9 while being raised in pressure by an unillustrated air blower or the like to be an end product (gypsum). By thus directly feeding air into the absorption tower 1, an absorption reaction of SOx in the exhaust gas and an oxidation reaction of the produced calcium sulfite are made to progress simultaneously, whereby a desulfurization reaction as a whole can be promoted.

Also, the air 14 to be fed to the liquid trapping section 9 at that time is miniaturized by an oxidizing agitator 15 to thereby increase the utilization rate of oxidization air. Thereafter, the absorption liquid slurry is extracted from the liquid trapping section 9 while being raised in pressure by an extraction pump 16 according to the amount of produced gypsum, sent to gypsum dehydration equipment 17, and collected as powder gypsum.

In recent years, there have been an increasing number of cases where a large capacity of exhaust gas from a large-capacity boiler or a plurality of boilers is treated by one absorption tower 1 for improvement in reliability of a wet-type exhaust gas desulfurizer and from an economic perspective. Moreover, when the concentration of SOx in an exhaust gas is high or when highly efficient desulfurization of a large capacity of exhaust gas or an exhaust gas with a high SOx concentration is required, the necessary desulfurization performance is satisfied by increasing the amount of circulation spray of the absorption tower 1.

Particularly in a plant where highly efficient desulfurization of a large capacity of exhaust gas with a high SOx concentration is required, the amount of liquid circulated through the absorption tower is increased. On the other hand, due to restriction on the capacity of absorption liquid to be sprayed by the spray nozzles 5 attached to the absorption tower spray header 3 and the installing number of spray nozzles 5 to be attached to each absorption tower spray header 3 and restriction on liquid feeding amount performance of the circulation pump 12, there is restriction on the amount of absorption liquid to be circulatively fed to the spray nozzles 5, and thus multiple stages of spray headers 3 are installed.

Figure 9:
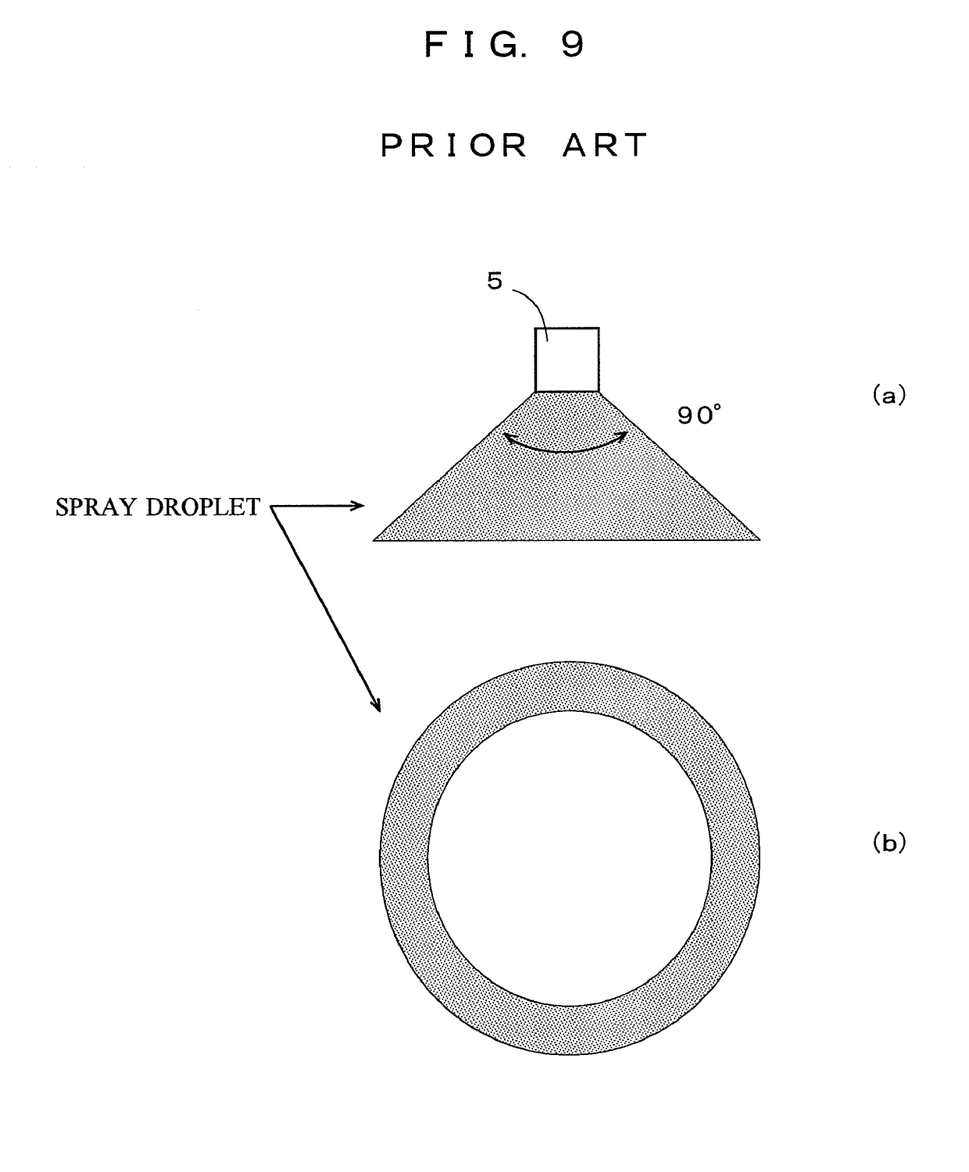
FIG. 9 is views showing a droplet spray pattern of spray nozzles of a conventional art.

In the above conventional art, the spray nozzles 5 installed in an absorbing section of the absorption tower 1 are arranged in a grid form so as to have as equal intervals as possible. Also, here, hollow cone-type spray nozzles 5 having spray angles of, as shown in FIG. 9, approximately 90 degrees with respect to a direction orthogonal to an exhaust gas flow are mainly used.

Patent Document 1: Japanese Published Unexamined Patent Application No. 2004-24945
Patent Document 2: Japanese Published Unexamined Patent Application No. H11-179144

DISCLOSURE OF THE INVENTION

Problems to be Solved by the Invention

Figure 10:
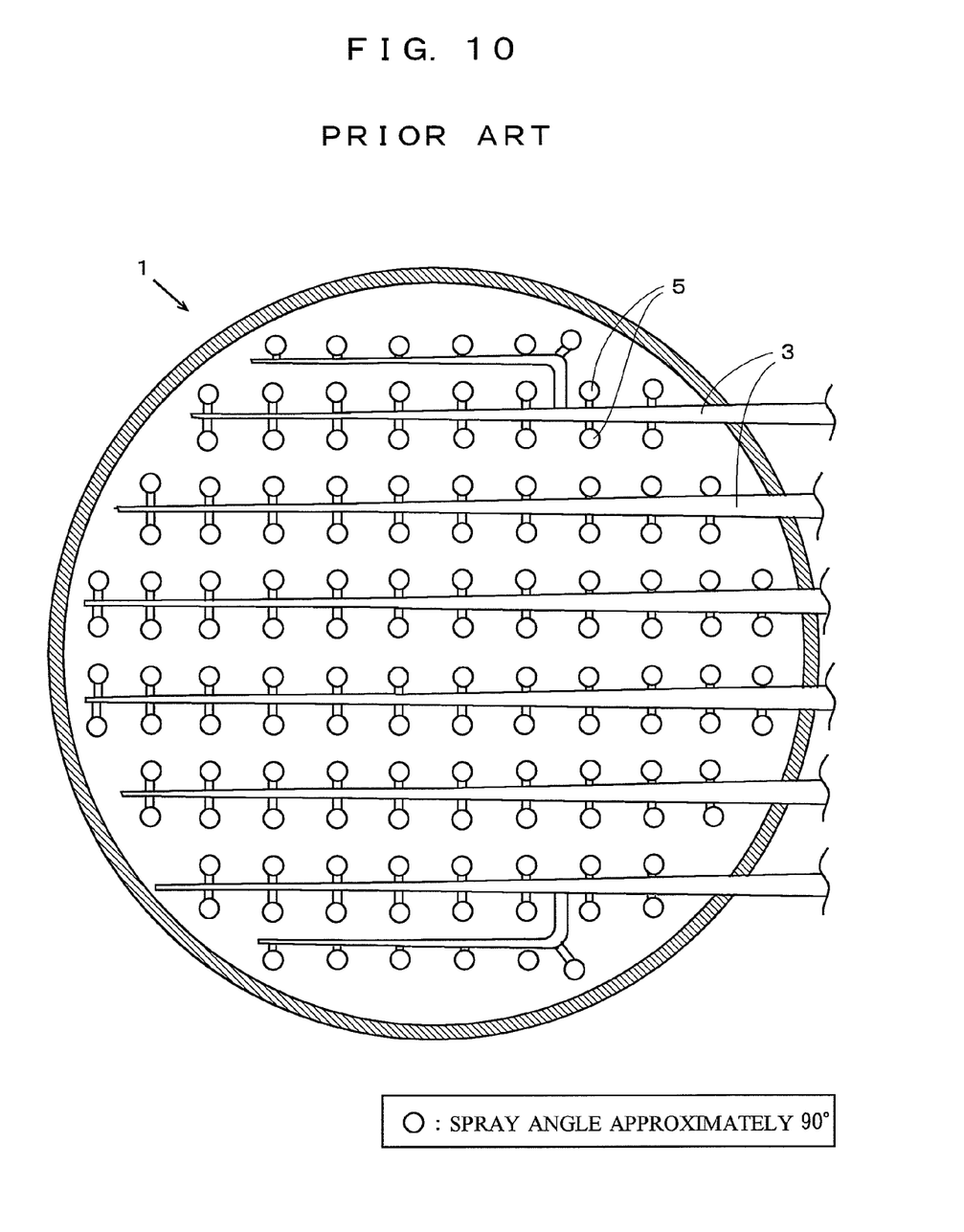
FIG. 10 is a view showing an arrangement of spray nozzles of a wet-type exhaust gas desulfurizer of a conventional art.

In the case of a vertical cylindrical absorption tower, usually, as shown in a view of the interior of an absorption tower 1 observed from an identical horizontal section on which spray headers 3 are arranged in FIG. 10, adopted is a construction where spray nozzles 5 are arranged on an identical horizontal plane in a simple grid form by the spray headers 3 that support spray nozzles 5 extended in one direction to cross the absorption tower 1 to attain a cost reduction. However, since the number of spray nozzles in the neighborhood of the tower wall is reduced, the droplet density in the neighborhood of the absorption tower tends to decline.

When a deviation in the droplet density thus occurs in the absorption tower, a larger amount of exhaust gas flows in a part with a low droplet density, and thus there has been a problem that no sufficient gas-liquid contact is performed, and SOx absorbing performance partially declines, which influences a whole desulfurization performance.

Moreover, with channeling of an exhaust gas that flows in the absorption tower, there has been a problem that the pressure loss tends to increase due to occurrence of an eddy current.

Furthermore, when the gas flow rate in the absorption tower is reduced to prevent such a phenomenon, there has been a problem in the point that it becomes necessary to increase the tower diameter of the absorption tower, and it is necessary to excessively increase the amount of the absorption liquid to be sprayed into the absorption tower.

To cope therewith, an invention has been disclosed in the above-mentioned Patent Document 1 (Japanese Unexamined Patent Application No. 2004-024945), where provided are, as the type of spray nozzles 5 to be installed in the neighborhood of the tower wall, full-cone nozzles (full-face annular spray-type nozzles) capable of also spraying droplets directly under the nozzles for preventing gas channeling in the absorption tower to prevent a decline in desulfurization performance, however, full-cone nozzles are larger in average droplet diameter and lower in liquid density than hollow-cone nozzles (annular spray-type nozzles), and are thus inferior in desulfurization performance with a poor gas-liquid contact efficiency.

Moreover, for preventing gas channeling in the absorption tower to prevent a decline in desulfurization performance, a measure has also been taken for increasing the number of spray nozzles to be arranged in the neighborhood of the tower wall, however, at spray angles of the absorption liquid of around 90 degrees as shown in FIG. 9, there has also been a problem in the point that the amount of the absorption liquid to be sprayed onto the tower wall without sufficiently making contact with an exhaust gas increases, so that a large amount of absorption liquid becomes necessary.

On the other hand, in the central part of the absorption tower, narrow spray angles of the absorption liquid result in a narrow sprayed sectional area, and it is necessary to arrange a large number of nozzles 5 at reduced nozzle intervals, and thus there has been a problem in not only a high cost but also a high pressure loss. Moreover, there is also a problem that narrow spray angles of the absorption liquid tend to result in a large spray droplet diameter, and desulfurization performance tends to decline due to the large spray droplet diameter.

It is an object of the present invention to inhibit channeling of an exhaust gas that flows in an absorption tower to thereby prevent the desulfurization performance from lowering due to pass-by of the exhaust gas in the neighborhood of the absorption tower wall when the gas flow rate in the absorption tower is increased and the absorption tower is downsized, inhibit an extremely high pressure loss by a flow-regulating effect of sprayed droplets, and thus provide a wet-type exhaust gas desulfurizer with a reduced total cost.

Means for Solving the Problems

The abovementioned object of the present invention can be achieved by the following solution means.

A first aspect of the invention provides a wet-type exhaust gas desulfurizer including: an absorption tower in which an exhaust gas emitted from a combustion apparatus is introduced, and an absorption liquid containing a slurry including limestone or lime is sprayed into the exhaust gas from a plurality of spray nozzles of spray headers provided in multiple stages along a direction of an exhaust gas flow to absorb and remove soot and dust contained in the exhaust gas, a sulfur oxide, and substances caused by components included in a fuel used in the combustion apparatus; and an absorption liquid trapping section provided in a lower portion of the absorption tower, wherein the plurality of spray nozzles provided in each spray header are annular spray-type (hollow cone type) spray nozzles, which spray the absorption liquid radially at spray angles of 50 degrees to 80 degrees with a direction counter to an exhaust gas flow as a center in a neighborhood of an absorption tower wall, and in a central part of the absorption tower, radially at spray angles of 80 degrees to 130 degrees with a direction counter to the exhaust gas flow as a center.

Figure 3:
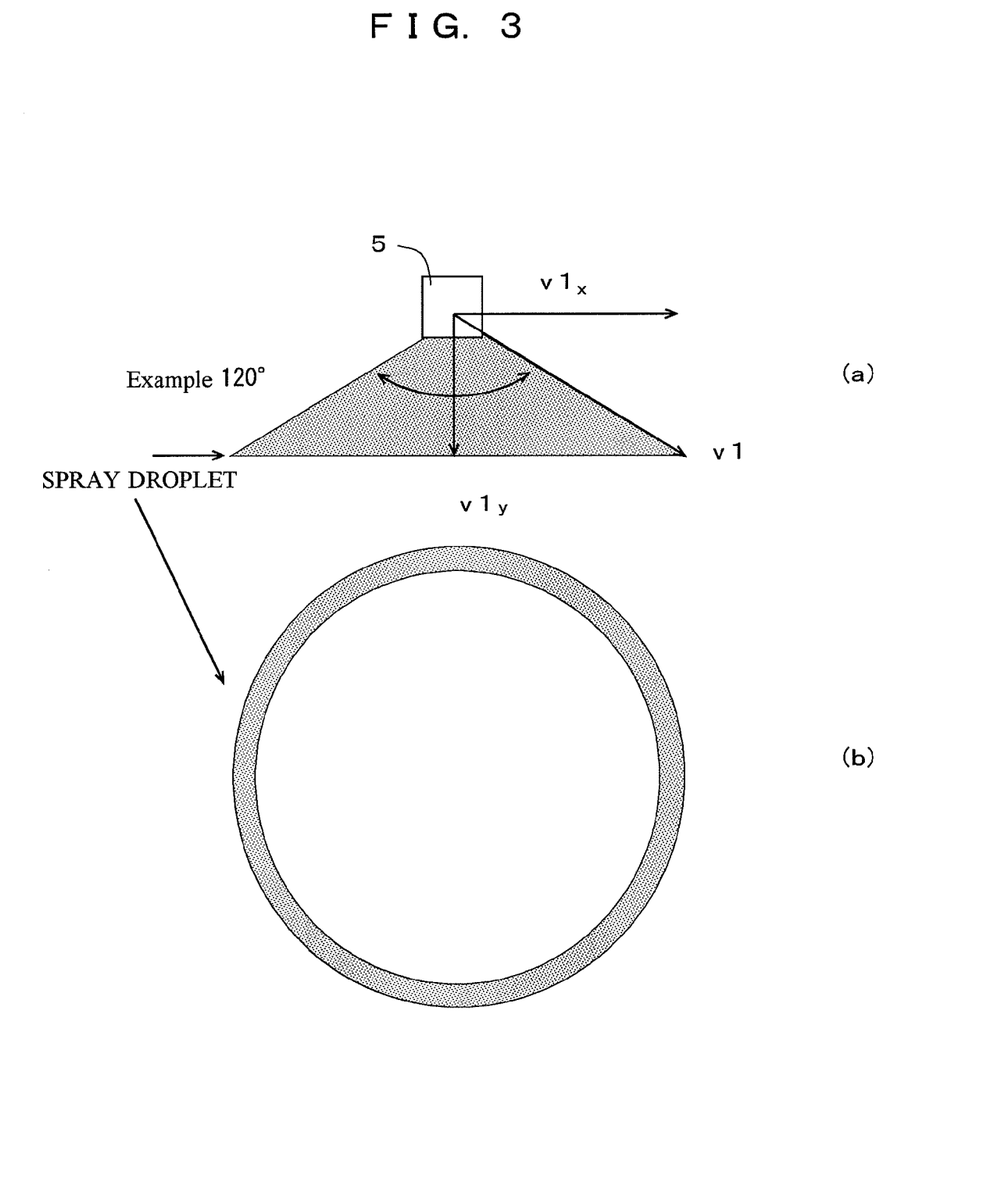
FIG. 3 is views showing a droplet spray pattern of wide-angle spray nozzles of the present invention.
Figure 4:
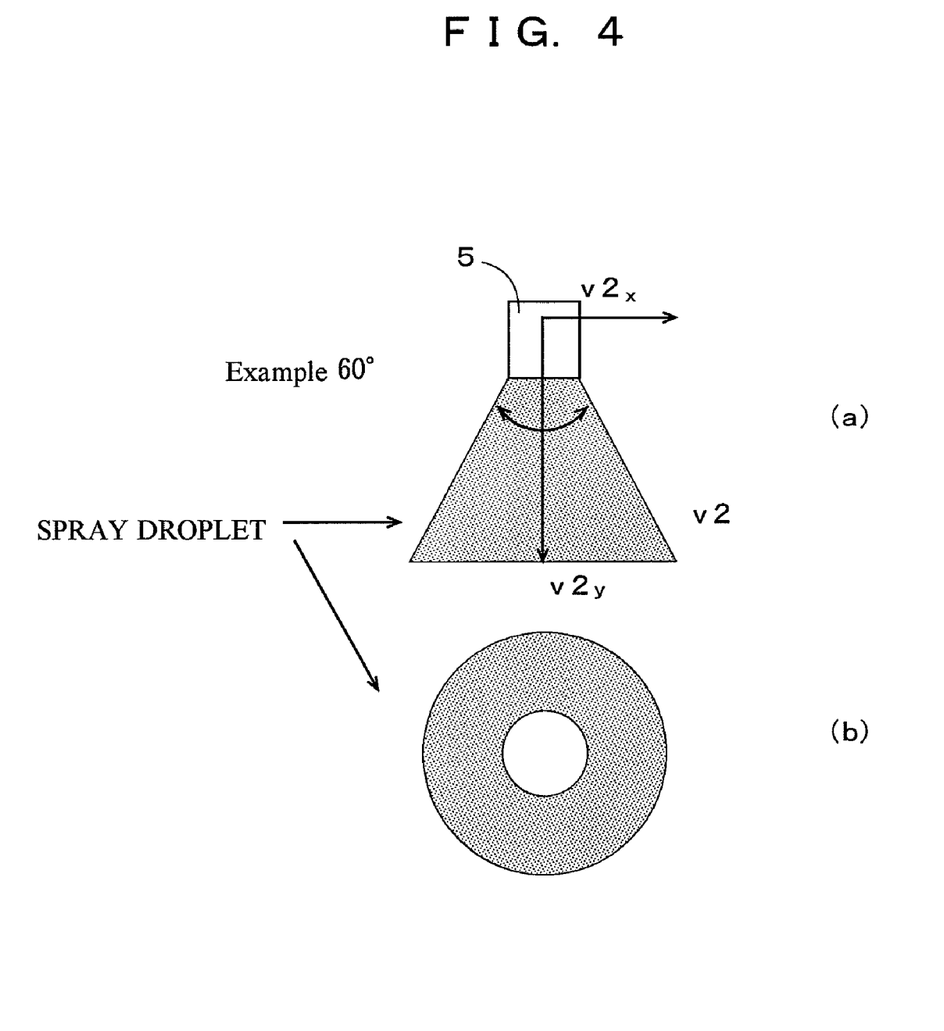
FIG. 4 is views showing a droplet spray pattern of narrow-angle spray nozzles of the present invention.

FIG. 3 shows a side view (FIG. 3(*a*)) where hollow cone-type spray nozzles arranged in the central part of an absorption tower spray an absorption liquid radially at downward spray angles of 80 degrees to 130 degrees and a plan view (FIG. 3(*b*)) of a sprayed absorption liquid observed from the downside, and FIG. 4 shows a side view (FIG. 4(*a*)) where hollow cone-type spray nozzles arranged in the neighborhood of the tower wall of an absorption tower spray an absorption liquid radially at downward spray angles of 50 degrees to 80 degrees and a plan view (FIG. 4(*b*)) of a sprayed absorption liquid observed from the downside.

In the present embodiment, by spraying the absorption liquid by the spray nozzles arranged in the neighborhood of the tower wall of an absorption tower where the droplet density declines at a section in the direction orthogonal to a gas flow of the absorption tower radially at downward spray angles of 50 to 80 degrees, a decline in liquid density per absorption tower sectional area is prevented, and a deviation in droplet density is reduced at any part of the absorption tower section, so that a phenomenon that an exhaust gas short-passed through a part with a low droplet density results in insufficient gas-liquid contact and SOx absorbing performance simultaneously declines no longer occurs. Moreover, the amount of the absorption liquid to be sprayed onto the tower wall without sufficiently making contact with an exhaust gas decreases, which leads to a reduction in the absorption liquid amount and a reduction in the power of a circulation pump.

Moreover, in the present embodiment, the average droplet diameter is reduced by providing the spray angles of the spray nozzles arranged in the central part of the absorption tower at 80 to 130 degrees. Because an absorption liquid film therefore spreads out, the film thickness is accordingly reduced so that, when making contact with an exhaust gas, the absorption liquid is atomized to improve SOx absorbing performance, and furthermore, the sprayed sectional area is increased, which leads to a reduction in the number of spray nozzles and a reduction in the pressure loss.

A second aspect of the invention provides the wet-type exhaust gas desulfurizer according to the first aspect, wherein spray nozzles in the neighborhood of the absorption tower wall arranged within two meters from the absorption tower wall spray the absorption liquid radially at spray angles of 50 degrees to 80 degrees with a direction counter to an exhaust gas flow as a center.

Figure 8:
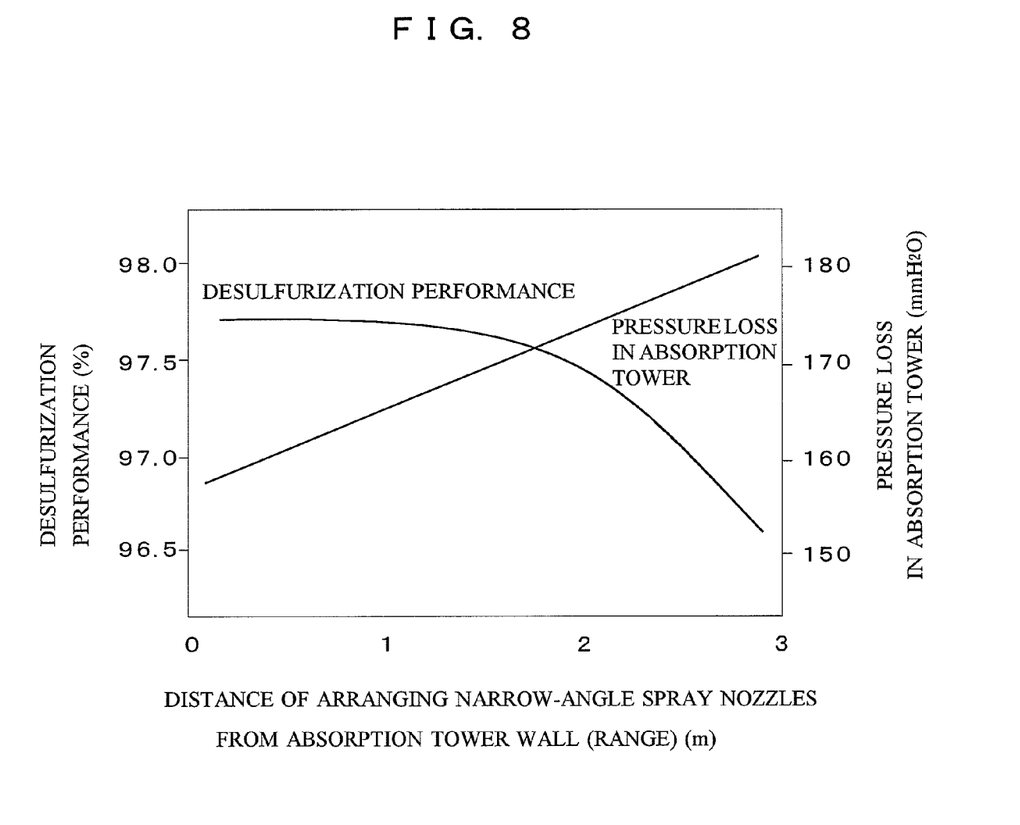
FIG. 8 is a graph showing a relationship between the desulfurization performance relative to the distance of spray nozzles in the neighborhood of a tower wall from the tower wall and pressure loss in the absorption tower of the embodiment of the present invention.

Arranging spray nozzles in the neighborhood of the absorption tower wall within two meters from the absorption tower wall allows not only preventing blow-by of a gas in the neighborhood of the absorption tower wall but also striking a balance between desulfurization performance and an increase in the pressure loss of an exhaust gas in the absorption tower (see FIG. 8).

EFFECTS OF THE INVENTION

According to the first aspect of the invention, even when the exhaust gas flow rate in the absorption tower is increased, a pressure loss of the absorption tower and the circulating liquid amount can be prevented from being excessively increased while desulfurization performance is maintained, so that there is an effect to allow a reduction in the installed capacity.

According to the second aspect of the invention, besides the effect of the first aspect of the invention, there is an effect to prevent blow-by of a gas in the neighborhood of the absorption tower wall and strike a balance between desulfurization performance and an increase in the pressure loss of an exhaust gas in the absorption tower.

BEST MODE FOR CARRYING OUT THE INVENTION

Figure 1:
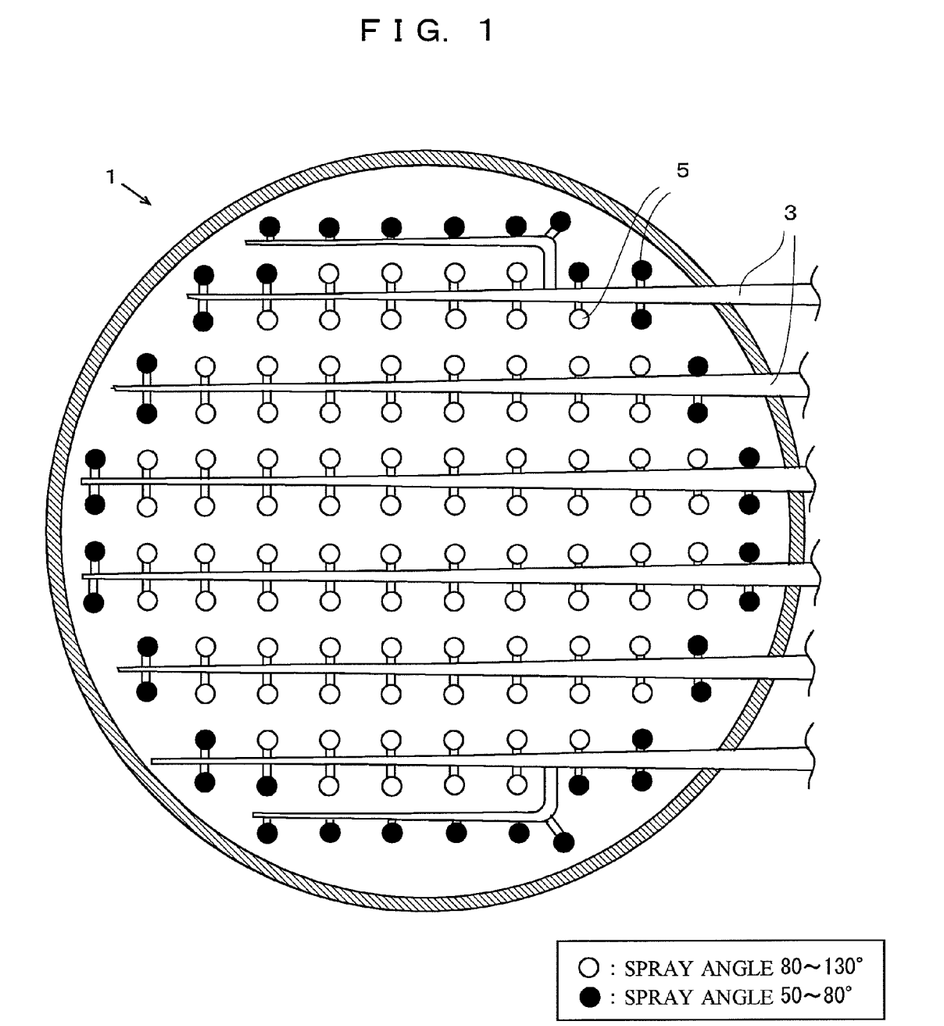
FIG. 1 is a view showing an arrangement of spray nozzles of an absorption tower of an embodiment of the present invention, wherein spray nozzles with spray angles of 50 to 80 degrees are arranged in the neighborhood of a tower wall of the absorption tower and spray nozzles of spray angles of 80 to 130 degrees are arranged in a central part of the absorption tower.

An arrangement of spray nozzles of an absorption tower spray section of a wet-type exhaust gas desulfurizer of an embodiment of the present invention is shown in FIG. 1. FIG. 1 is a view of the interior of an absorption tower 1 observed from an identical horizontal section on which spray headers 3 are arranged, wherein arranged on an identical horizontal plane are annular spray-type (hollow cone type) spray nozzles 5 in a simple grid form by the spray headers 3 for supporting spray nozzles 5 extended in one direction to cross the absorption tower 1. The parts marked out in black in the figure show spray nozzles 5 having absorption liquid spray angles of 50 to 80 degrees, and other parts show spray nozzles 5 having absorption liquid spray angles of 80 to 130 degrees. By providing the spray nozzles 5 having absorption liquid spray angles of 50 to 80 degrees in the neighborhood of a tower wall where blow-by of an exhaust gas easily occurs, blow-by of an exhaust gas in the neighborhood of the tower wall can be prevented, so that a deviation in the flow rate of the exhaust gas in the absorption tower 1 is reduced between the neighborhood of the tower wall and a central part of the absorption tower, and desulfurization performance is improved.

Figure 5:
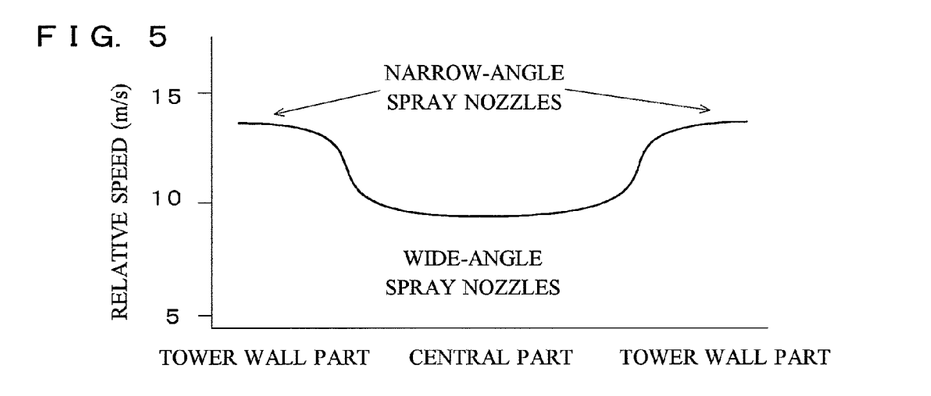
FIG. 5 is a graph showing the spray nozzle position in the tower of the embodiment of the present invention and the relative speed of gas to a sprayed liquid.

Moreover, as shown in FIG. 5, when the hollow cone-type spray nozzles 5 having absorption liquid spray angles of 50 to 80 degrees are used in the neighborhood of the tower wall and the hollow cone-type spray nozzles 5 having absorption liquid spray angles of 80 to 130 degrees in the central part of the tower, a relative speed of an exhaust gas to the liquid flow rate of a spray liquid in a tower wall part becomes higher than that in the central part of the tower, and a pressure loss of the tower wall part becomes larger than that of the central part of the absorption tower to allow preventing blow-by of the exhaust gas. Moreover, the amount of a liquid that hits the absorption tower wall is reduced and the flying distance of sprayed droplets is increased, which leads to a reduction in the amount of a circulating liquid necessary for exhibiting the equivalent performance.

Figure 6:
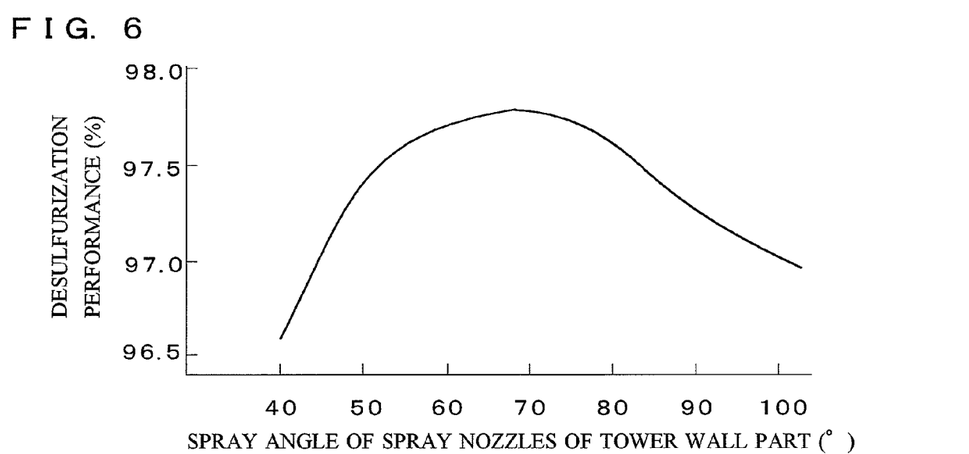
FIG. 6 is a graph showing the desulfurization performance of the embodiment of the present invention when the droplet spray angles of spray nozzles in the neighborhood of a tower wall are changed.

Moreover, as shown in FIG. 6, providing the downward absorption liquid spray angles of the spray nozzles 5 of the tower wall part at 50 to 80 degrees improves desulfurization performance.

Thus, by spraying the absorption liquid by the spray nozzles 5 arranged in the neighborhood of the absorption tower wall radially at downward spray angles of 50 to 80 degrees, a decline in liquid density per absorption tower sectional area is prevented, and a deviation in droplet density is reduced at any part of the absorption tower section, so that a phenomenon that an exhaust gas short-passed through a part with a low droplet density results in insufficient gas-liquid contact and SOx absorbing performance simultaneously declines no longer occurs.

Figure 7:
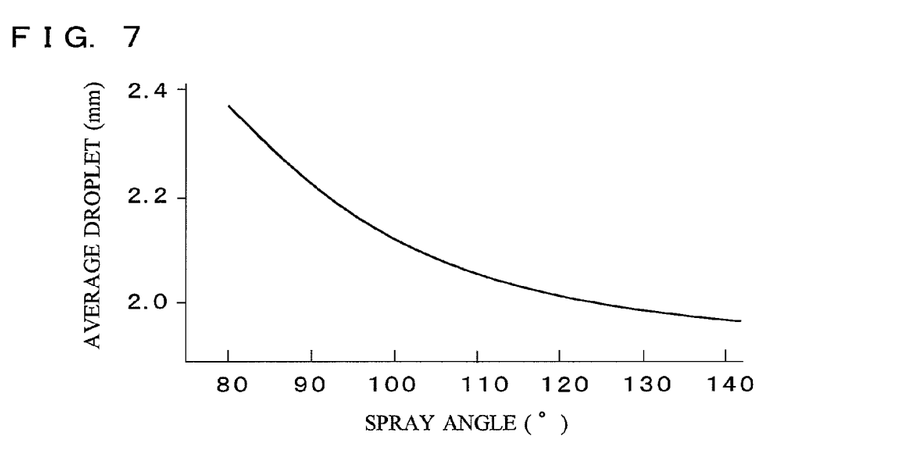
FIG. 7 is a graph showing a relationship between the absorption liquid spray angles of an absorption liquid from spray nozzles and the average droplet diameter of the embodiment of the present invention.

Moreover, the average droplet diameter is reduced by providing the spray angles of the spray nozzles 5 installed in the central part of the absorption tower at 80 to 130 degrees as shown FIG. 7. Because an absorption liquid film therefore spreads out, the film thickness is accordingly reduced so that, when making contact with an exhaust gas, the absorption liquid is atomized to improve SOx absorbing performance, and furthermore, the sprayed sectional area is increased, which leads to a reduction in the number of spray nozzles 5 and a reduction in the pressure loss.

Moreover, although the spray nozzles (narrow-angle spray nozzles) 5 that spray the absorption liquid radially at downward spray angles of 50 to 80 degrees while being arranged in the neighborhood of the absorption tower wall exhibit high desulfurization performance, the pressure loss in the absorption tower is increased with increasing distance of the arranging positions of the spray nozzles 5 from the tower wall. Since such a large pressure loss is larger than that of the spray nozzles 5 having absorption liquid spray angles of 80 to 130 degrees, the spray nozzles 5 that spray the absorption liquid at spray angles of 50 to 80 degrees are arranged, as shown in FIG. 8, in the present embodiment, at positions within two meters from the tower wall so as to balance desulfurization performance with a pressure loss.

Thus, by reducing a difference in pressure between the central part of the absorption tower and the neighborhood of the tower wall, blow-by in the neighborhood of tower wall can also be prevented. Moreover, in the present embodiment, by applying a uniform resistance to the exhaust gas in the absorption tower as a whole including the neighborhood of the tower wall as well as the central part of the tower, an exhaust gas flow is regulated, and occurrence of an eddy current that becomes a factor for an increase in the pressure loss can be suppressed. Accordingly, an excessive increase in the pressure loss is eliminated.

According to the present embodiment, by applying a uniform resistance to the exhaust gas in the absorption tower as a whole including the neighborhood of the tower wall as well as the central part of the tower, an exhaust gas flow is regulated, and occurrence of an eddy current that becomes a factor for an increase in the pressure loss can be suppressed. Accordingly, an excessive increase in the pressure loss is eliminated.

Figure 2:
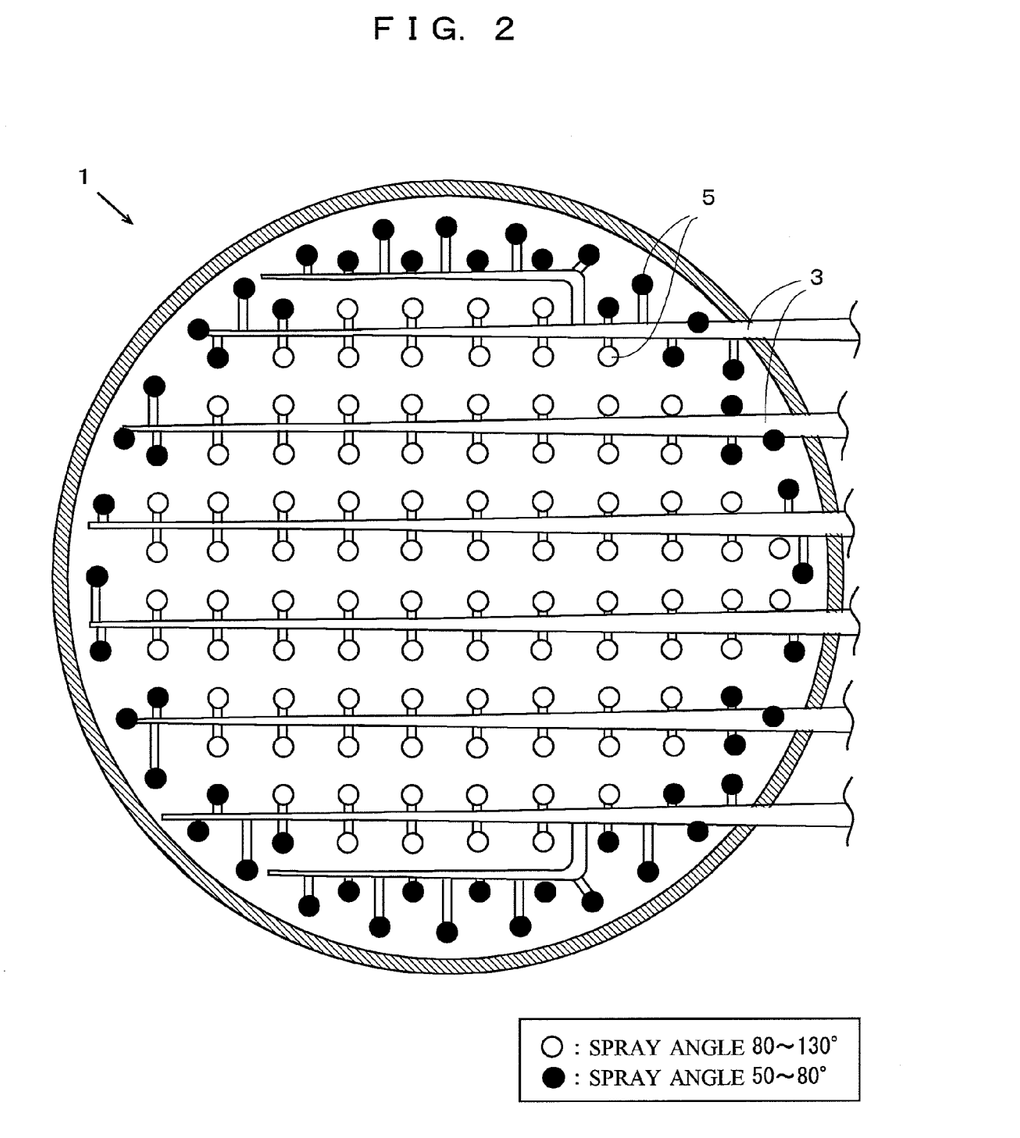
FIG. 2 is a view in which spray nozzles with spray angles of 50 to 80 degrees are arranged in an arc shape in the neighborhood of a tower wall of an absorption tower of an embodiment of the present invention and spray nozzles with a spray angle of 80 to 130 degrees are arranged in a grid form in a central part of the absorption tower.

Another embodiment of the present invention is shown in FIG. 2. For the present embodiment, annular spray-type (hollow cone-type) spray nozzles 5 are arranged in a grid form at absorption liquid spray angles of 80 to 130 degrees in the central part of the absorption tower, and in the neighborhood of the tower wall, spray nozzles 5 having absorption liquid spray angles of 50 to 80 degrees are arranged, and furthermore, the spray nozzles 5 in the neighborhood of the tower wall are uniformly arranged in an arc form, whereby a deviation in the droplet density is reduced, so that a phenomenon that an exhaust gas short-passed through a part with a low droplet density results in insufficient gas-liquid contact and SOx absorbing performance declines no longer occurs.

INDUSTRIAL APPLICABILITY

A wet-type exhaust gas desulfurizer has high industrial applicability since desulfurization performance never declines even when an absorption tower thereof is downsized and the gas flow rate in the absorption tower is increased.

What is claimed is:

1. A wet-type exhaust gas desulfurizer comprising:
a vertical cylindrical absorption tower in which an exhaust gas emitted from a combustion apparatus is introduced, and an absorption liquid containing a slurry including limestone or lime is sprayed into the exhaust gas from a plurality of spray nozzles of spray headers provided in multiple stages along a direction of an exhaust gas flow to absorb and remove soot and dust contained in the exhaust gas, a sulfur oxide, and substances caused by components included in a fuel used in the combustion apparatus, the spray nozzles being provided in a grid form; and
an absorption liquid trapping section provided in a lower portion of the absorption tower, wherein
the plurality of spray nozzles provided in each spray header are annular spray-type (hollow cone type) spray nozzles, which spray the absorption liquid radially at spray angles of 50 degrees to 80 degrees with a direction counter to an exhaust gas flow as a center in a neighborhood of an absorption tower wall, and in a central part of the absorption tower, radially at spray angles of 80 degrees to 130 degrees with a direction counter to the exhaust gas flow as a center.

2. The wet-type exhaust gas desulfurizer according to claim 1, wherein spray nozzles in the neighborhood of the absorption tower wall arranged within two meters from the absorption tower wall spray the absorption liquid radially at spray angles of 50 degrees to 80 degrees with a direction counter to an exhaust gas flow as a center.

* * * * *